May 15, 1951 J. J. HRUSKA 2,553,319
MULTIPLE CHAMBER TIRE
Original Filed Feb. 25, 1944
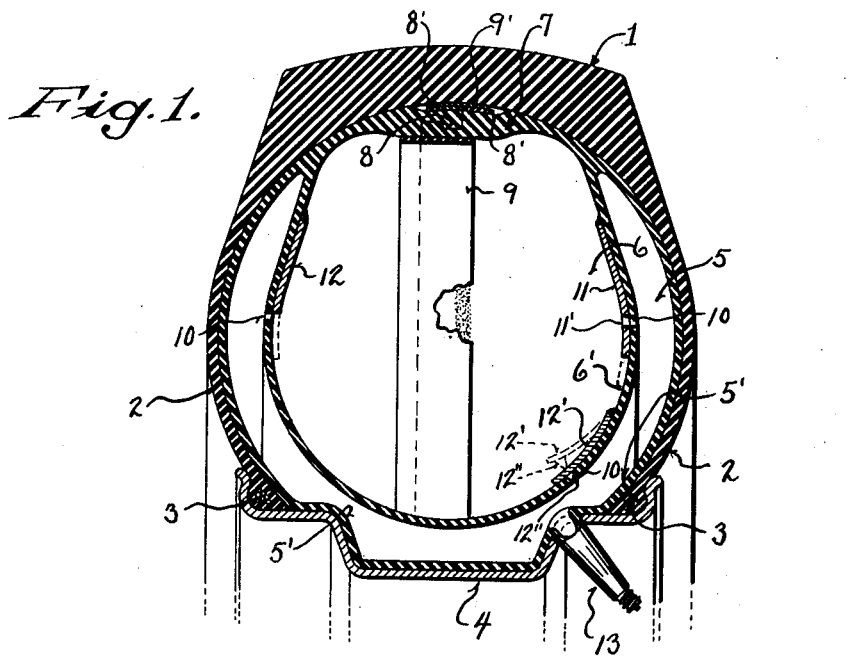
Fig. 1.
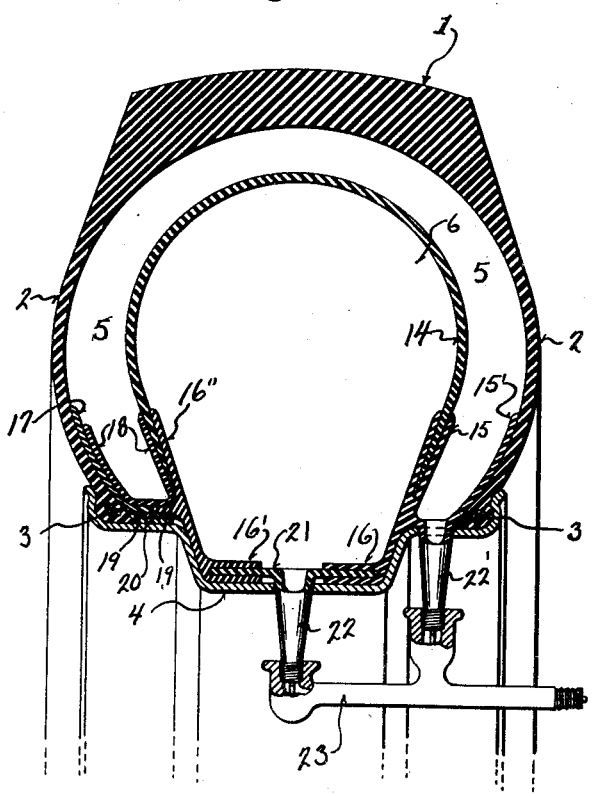
Fig. 4.
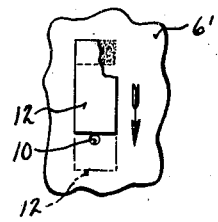
Fig. 2.
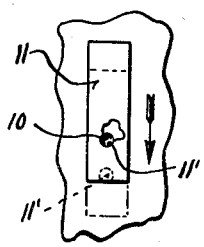
Fig. 3.
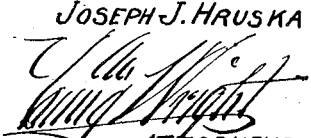
INVENTOR.
JOSEPH J. HRUSKA
BY
ATTORNEYS.

Patented May 15, 1951

2,553,319

UNITED STATES PATENT OFFICE 2,553,319

MULTIPLE CHAMBER TIRE

Joseph J. Hruska, Milwaukee, Wis.

Original application February 25, 1944, Serial No. 523,856. Divided and this application November 23, 1946, Serial No. 712,029

2 Claims. (Cl. 152—342)

My invention refers to double compartment pneumatic tires having a heavy punctureproof tread, wherein when the side walls of the outer compartments develop leakage through puncture or other causes, the inner compartment will maintain the load to prevent accidents by a total collapse of said tire.

The specific object of my invention is to provide an inflating valve for the outer compartment and second valve controlled inflating ports for the main inner compartment.

A further object of my invention is to provide double valve control nipples for directly and simultaneously inflating both compartments at a uniform pressure.

The above referred to invention is a division of my patent application, Number 523,856, filed February 25, 1944, which has matured into Patent No. 2,547,191 on April 3, 1951.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as come within the scope of the claims.

In the accompanying drawings, is illustrated one complete example of the physical embodiment of the present invention constructed according to the best mode so far devised for the practical application of the principles thereof.

In the drawings:

Figure 1 represents a cross sectional view of a double compartment pneumatic tire embodying the features of my invention.

Figure 2 is a fragmentary face view of a form of valve control for the inner compartment.

Figure 3 is another form of said valve.

Figure 4 is a cross sectional view of another form of my invention wherein valve controlled ports for the inner compartments are dispensed with and both compartments have companion valve control nipples for simultaneously inflating the same.

Referring by characters to the drawing, with special reference to Figures 1 to 3 inclusive of the same, 1 indicates a non-puncture proof tread having side walls 2 terminating at their base ends with clincher beads 3 seated in a standard tire rim 4.

Nested within the casing is a double wall tube having an outer compartment 5 and an inner main compartment 6, the same being merged into a heavy tread 7.

The tread 7 is split by an interlocked seam 8 whereby access for repairs may be had to the main inner compartment and also for use in assemblage and for convenience in manufacture.

The tread seam 8 intermediately is closed by a flat tape 9 having an edge vulcanized to one wall of the seam and free at the other edge to lap the companion wall.

The outer edges of the dividing seam 8 are suitably reinforced by strips 8' and said seam is then sealed by adhesive tapes 9', which tapes 9' are ripped off when access is desired to the main compartment for repairs or the like.

As shown in Figures 1 to 3 inclusive of the drawings, the inner compartment wall 6' is provided with ports 10, which ports are controlled by valve members to be hereinafter specifically described. One of the upper pairs of ports 10 is controlled by a valve patch 11 having an end vulcanized to the wall 6' above the port 10. The free end of the valve patch is provided with an aperture 11', which, under normal inflation conditions, registers with the port whereby air from the outer compartment will freely flow into the inner compartment.

When said inner compartment 6 is partially deflated by puncture or leakage from the outer compartment, it is apparent that the walls 6' of the inner compartment will collapse slightly and downwardly from the tread to thus cut off communication between the port 10 and the outer compartment 5 whereby a volume of air is confined within the inner compartment to support the load for a predetermined length of time whereby total collapse of the tire is avoided.

The companion associated port 10 is provided with a valve patch 12 having its upper edge vulcanized to the wall 6' with its free edge terminating just above the port 10, hence, when the inner compartment 6 partially collapses, the lower edge of this patch valve 12 will slide over and close the communicating port 10.

As indicated in Figure 1 of the drawings, a third valve controlled port 10 is provided with a flexible patch 12' secured at one end to the wall 6' and its free end is provided with a nib 12" which normally closes the port 10.

For inflating the outer compartment 5, the base of the wall 5' has extending therefrom a standard valve control nipple 13. Hence, when air pressure is introduced through this nipple into the outer compartment, it will also pass through the ports 10 and uniformly inflate the inner compartment.

Referring especially to Figure 4 of the drawings, the side walls of the casing are similar to the casing previously described, from the walls of a continuous outer compartment 5.

Nested with this casing is a single tube 14, one lower end of which has vulcanized thereto a slotted inner lapped flange 15 of a base ring 16. The flange 15 has an outer spaced flange 15' which flange is vulcanized to the inner face of the casing side wall 2.

A companion flange 16" extends upwardly from a base ring 16, and it is vulcanized to the associated end of the tube 14.

An outer circumferentially split flange 17 also extends from the flange 16" and the split end of the same is secured by vulcanization to the wall 2 of the casing. The split in the above mentioned double flange unit is sealed by a U-shaped flap 18, one stem of which is vulcanized to the end of the tube 14 while the outer stem loosely engages the ring flange 17, as shown. The bottom wall space between the flanges 16" and 17, is reinforced by tape 19 to which tape a circular ribbon 20 is adhesively secured, whereby the split or seam is sealed.

It is understood that the division split between the flanges is for the purpose of permitting access to the outer compartment 5 formed by the spaced walls 2 of the casing and associated tube wall 14.

The base rings 16 and 16' are grooved for the reception of a band 21, which band is secured by vulcanization to complete the inner tube.

The band 21 and the associated base ring flanges 15 and 15' have extending therefrom a pair of inflating nipples 22 and 22', which nipples, as shown, are adapted to be fitted with a double nozzle air inflation head 23.

Hence, by this simple arrangement pressure from the pump may be simultaneously and directly introduced into the inner and outer compartments.

While I have shown and described three forms of valves, it is understood that I may use any one of these valves without departing from the spirit of my invention.

I claim:

1. In a pneumatic tire, a wheel rim, a one-piece tube inserted within a tire casing, the one-piece tube comprising a heavy split tread having extended from its ends endless walls spaced apart to form a large inner air chamber and a restricted outer air chamber, the split tread having interlocked tongue and grooves, inner and outer adhesive tapes for closing the seams in the split tread, an inwardly opening valve for the inner wall of the tube and a valve controlled air nipple extending through the tire rim in communication with the air space between the inner and outer tube walls.

2. In a pneumatic tire, a wheel rim, a one-piece inner tube and a tire casing, the inner tube comprising a heavy split tread portion having inter-locked tongues and grooves, inner and outer adhesive tapes for sealing the tread split, a main compartment formed by an endless thin inner compartment wall extending from the sides of the heavy tread portion, an outer thin wall extending from the sides of the heavy tread portion spaced from the inner compartment wall to form a chamber in connection therewith, said thin inner compartment wall having ports adjacent to the heavy split tread portion, said outer thin wall having an extended bottom seat for the wheel rim, a flexible nipple communicating with the extended bottom seat of the outer wall, and flexible patch strips having ends secured to the thin inner wall beyond the ports, the other ends of the patch strips terminating beyond the ports when the tire is fully inflated, whereby upon leakage of air from the outer chamber the side walls of the tire will partly collapse and cause the patch strip ends to travel over the ports and close the ports.

JOSEPH J. HRUSKA.

REFERENCES CITED

The following references are of record in the file of this patent:

UNITED STATES PATENTS

| Number | Name | Date |
| --- | --- | --- |
| 1,331,541 | VanMeeteren | Feb. 24, 1940 |
| 2,244,941 | Degnon | June 10, 1941 |
| 2,268,370 | Barkeij | Dec. 30, 1941 |
| 2,343,828 | Burkley | Mar. 7, 1944 |
| 2,404,578 | Liska | July 23, 1946 |